United States Patent [19]

Joyce

[11] Patent Number: 4,853,457

[45] Date of Patent: Aug. 1, 1989

[54] PREPARATION OF SPIROBIINDANE POLYARYLATES, AND SPIROBIINDANE POLYARYLATE-POLYETHYLENE TEREPHTHALATE COPOLYMERS, VIA MELT POLYMERIZATION

[75] Inventor: Richard P. Joyce, Clifton Park, N.Y.

[73] Assignee: General Electric Company, Schenectady, N.Y.

[21] Appl. No.: 112,587

[22] Filed: Oct. 26, 1987

[51] Int. Cl.$^4$ ............................................. C08G 63/26
[52] U.S. Cl. .................................... 528/190; 528/298
[58] Field of Search ................................ 528/190, 298

[56] References Cited

U.S. PATENT DOCUMENTS

| | | | |
|---|---|---|---|
| 3,725,070 | 4/1973 | Hamb et al. | 528/298 |
| 4,294,956 | 10/1981 | Berger et al. | 528/179 |
| 4,296,232 | 10/1981 | Maresca et al. | 528/179 |
| 4,340,454 | 7/1982 | Martin et al. | 528/190 |
| 4,552,949 | 11/1985 | Mark | 528/201 |
| 4,605,726 | 8/1986 | Mark | 528/190 |
| 4,612,360 | 9/1986 | Ort | 528/182 |
| 4,757,132 | 7/1988 | Brunelle et al. | 528/298 |

FOREIGN PATENT DOCUMENTS 61-113615  5/1986  Japan .

OTHER PUBLICATIONS

K. C. Steuben, "Polymers Containing the 3,3,3',3'-Tetramethyl-1'-Spirobiindame Residue", Journal of Polymer Science: Part A, vol. 3, pp. 3209-3217 (1965).

*Primary Examiner*—Veronica P. Hoke
*Attorney, Agent, or Firm*—William H. Pittman; James C. Davis, Jr.

[57] ABSTRACT

The preparation of spirobiindane polyarylate compositions having reduced cyclic oligomer formation and glass transition temperature which can be varied depending upon the percent composition of linear diacids and linear dihydric phenols present therein. Spirobiindane polyarylate-polyester copolymers and methods for their preparation are also disclosed.

5 Claims, No Drawings

PREPARATION OF SPIROBIINDANE POLYARYLATES, AND SPIROBIINDANE POLYARYLATE-POLYETHYLENE TEREPHTHALATE COPOLYMERS, VIA MELT POLYMERIZATION

This invention relates to aromatic polyesters, sometimes referred to a polyarylates, and more particularly to such polyesters which contain a spirobiindane moiety in the main polymer chain and to methods for making homopolymers and copolymers of spirobiindane-containing aromatic polyesters.

The polyarylates of this invention are aromatic polyesters derived from a spirobiindane dihydric phenol and, optionally, a non-spirodihydric phenol, such as 2,2-bis(4-hydroxyphenyl)propane-6,6'-diol and aromatic dicarboxylic acids such as terephthalic and isophthalic acid. These polyarylates have many superior properties which make them useful as engineering thermoplastics, including good mechanical properties, high glass transition temperature, good fire retardancy, and good solvent resistance. They also have good processibility which allows them to be molded into articles.

This invention relates to polarylates which contain a spirobiindane moiety to the main polymer chain. The only previously known spirobiindane polyarylate preparation method is through the use of spirobiindane bisphenol and isophthaloyl chloride. K.C. Stueben, "Journal of Polymer Science: Part A", 3, (1965) pp. 3209–3217, reported the preparation of a spirobiindane isophthalate by an interfacial polymerization reaction. Independent preparation of the disclosed polyarylate material, however, produced a product having a molecular weight and a glass transition temperature much lower than that reported by Steuben.

In the Stueben process for producing spirobiindane polyarylates, a problem exits which must be solved in order to have a homogeneous polyarylate compound prepared. When spirobiindane compounds are condensed with ring-inducing diacids, i.e. diacids having nonlinear configuration such as isophthalic acid, to form polyarylates, a low molecular weight fraction is generated which may add a deleterious plasticizing property to the high polymeric compound prepared. These low molecular weight materials are believed to be a series of cyclic spirobiindane polyarylates of the formula:

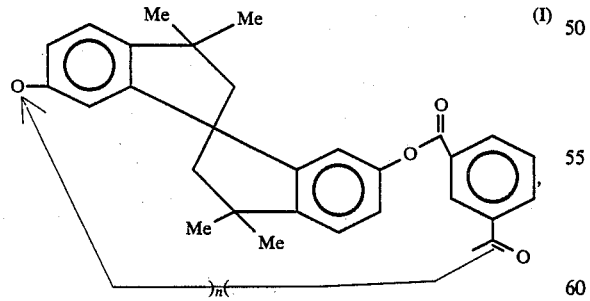

wherein S is 1,2,3,4,5.

It is theorized that the formation of these cyclic polarylates occur either via a chain scission and subsequent cyclization of the long-chain polyarylate after it has been formed or directly from the short chain oligomers. This transformation is believed to be equilibrium controlled with the equilibrium shifting in favor of the creation of the long-chain polymer at elevated temperatures and concentrations experienced in the melt process.

The use of spirobiindane polyarylates for polymeric melt blends may be restricted because of the high glass transition temperature associated with these polyarylates. It may be impossible to use polyarylates which contain spirobiindane moieties in certain melt blends because temperature requirements for polyarylate melt blending may prohibit the use of polymeric resins having much lower glass transition temperatures.

An object of the present invention, therefore, is to prepare a spirobiindane polyarylate with minimal cyclic oligomer formation, through the use of a linear diacid.

A further object is to prepare SBI polyarylates with minimal cyclic oligomer formation through the addition of linear monomers, such as bisphenol A in combination with terephthalic acid to SBI-isophthalic acid homopolymers.

A further object is to prepare a spirobiindane copolyarylate with a preselected specific glass transition temperature between the glass transition temperatures of the corresponding homopolyarylates by varying the percent composition of each of the monomers in the polymerization reaction.

A further object is to prepare spirobiindane polyarylate-polyester copolymers having higher molecular weight and lower glass transition temperatures than the original spirobiindane polyarylate.

A further object is to prepare a spirobiindane polyarylate-polyester copolymer possessing a glass transition temperature significantly higher than any previously formed polyarylate-polyester copolymer.

These and other objects are achieved by the practice of this invention and will appear hereinafter.

The homopolyarylates and copolyarylates described herein can be prepared by melt polymerizing in the presence of a diphenyl ether or a substituted derivative thereof and, optionally, a magnesium catalyst, (A) at least one spirodihydric phenol or specified derivative thereof having the formula

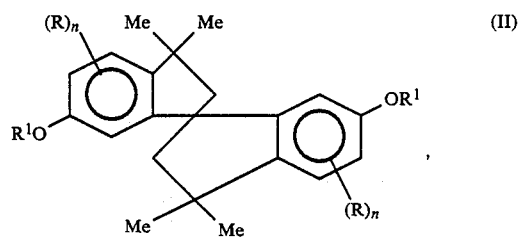

wherein R is a monovalent hydrocarbon radical selected from the group consisting of alkyl radicals, cycloalkyl radicals, aryl radicals, aralkyl radicals, alkaryl radicals, or halogen radicals, n is selected from positive integers having a value from 0 to 3 inclusive, and $R^1$ is hydrogen or acetyl radical;

(B) at least one aromatic dicarboxylic acid or specified derivative thereof having the formula:

wherein R² is an aryl or substituted aryl radicals, and R³ is a hydroxide or chloride radicals, (C) optionally, a dihydric phenol of the formula,

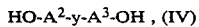

wherein each of A² and A³ is a monocyclic divalent aromatic radical, preferably p-phenylene and y is a bridging radical in which 1 of 2 atoms separate A² from A³, and the spirobiindane moiety comprises about 5–100% of total dihydroxyaromatic compounds in the mixture.

The resulting polyarylate can be received or further melt copolymerized with polyesters of the formula

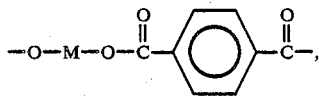

wherein M represents a chain of about 2 to about 4 methylene groups, to provide copolymers represented by formula:

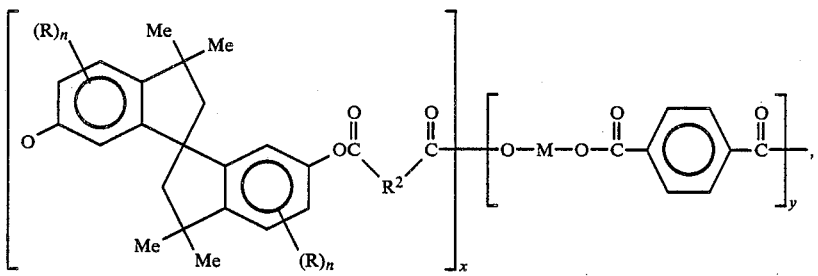

wherein X and Y represent the number of monomer units in the polymer chain or a segment of the chain.

The spiro dihydric phenols or substituted derivative thereof within the scope of this invention are those represented by the general formula:

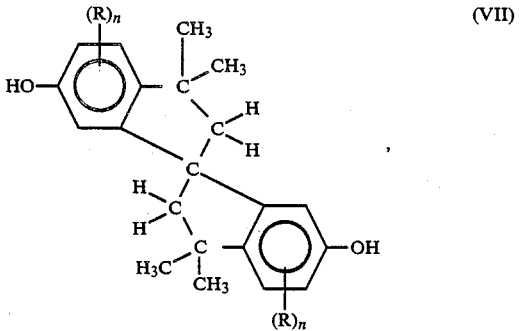

wherein R is independently selected from monovalent hydrocarbon radicals and halogen radicals; n is independently selected from positive integers having a value of from 0 to 3 inclusive, and R¹ is hydrogen or acetyl radical. The monovalent hydrocarbon radicals represented by R include the alkyl radicals, the cycloalkyl radicals, the aryl radicals, the aralkyl radicals, and the alkaryl radicals.

The alkyl radicals represented by R are preferably those containing from 1 to about 12 carbon atoms. These include the branched alkyl radicals and the straight chain alkyl radicals. Illustrative examples of suitable alkyl radicals include methyl, ethyl, propyl, isopropyl, butyl, tertiary-butyl, pentyl, neopentyl, and hexyl.

The cycloalkyl radicals represented by R are preferably those containing from 4 to about 7 ring carbon atoms. These include cyclobutyl, cyclopentyl, cyclohexyl, methylcyclohexyl, and cycloheptyl.

The aryl radicals represented by R are preferably those containing from 6 to 12 ring carbon atoms. These include phenyl, biphenyl, and naphthyl.

Preferred aralkyl and alkaryl radicals represented by R are those containing from 7 to about 14 carbon atoms. These include, but are not limited to benzyl, ethylphenyl, phenylbutyl, phenylpropyl, propylphenyl, and phenylethyl.

The preferred halogen radicals represented by R are chlorine and bromine.

Preferably R is independently selected from chlorine, bromine, and lower alkyl radicals containing from 1 to about 5 carbon atoms.

In the dihydric phenol compound of Formula VII when more than one R substituent is present they may be the same or different. The positions of the hydroxyl groups and R on the aromatic nuclear residues may be varied in the ortho, meta or para positions.

The spiro dihydric phenols of Formula VII are compounds that are known in the art and are commercially available or may be readily prepared by known methods. These methods of preparation of the spiro dihydric phenols of Formula VII include those described by R.F. Curtis and K.O. Lewis in "Journal of the Chemical Society" (England), 1962, p. 420; and R. F. Curtis in "Journal of the Chemical Society" (England), 1962, p. 417.

These spiro dihydric phenols may be conveniently prpared by (i) reacting two moles of a phenol with one mole of acetone, and (ii) thereafter co-reacting 3 moles of the product of (i) under acidic conditions to form the spiro dihydric phenols of Formula VII and 4 moles of a phenol. The acids which may be utilized in (ii) can include such acids as anhydrous methane sulfonic acid, anhydrous hydrochloric acid, and the like.

Illustrative examples of the spiro dihydric phenols within the scope of Formula (VII) include 5,5', 7,7'-tetrachloro-6,6'-dihydroxy-3,3,3',3'-tetramethyl-bis-1,1'-spiroindane(±);

3,3,5,7,3',3',5',7'-octamethyl-6,6'-dihydroxy-bis-1,1'-spiroindane(±);

5,7,5',7'-tetraethyl-6,6'-dihydroxy-bis-1,1'-spiroindane(±);

3,3,5,3',3',   5'-hexamethyl-6,6'-dihydroxy-bis-1,1'-spiroindane(±);

7,7'-dichloro-6,6'-dihydroxy-3,3,5,3', 3', 5'-hexamethyl-bis-1,1'-spiroindane(±); and 5',7'-diethyl-6,6'-dihydroxy-3,3,3', 3',5',7'-hexamethyl-bis-1,1'-spiroindane(±).

The polyarylates and polyarylate-polyester copolymers which may be prepared by the method of this invention are those containing units derived from a spiro dihydric phenol or alkyl- or halo-substituted analogs thereof. The preferred spirobiindane bisphenol is SBI.

For the polyarylates and polyarylate-polyester copolymers, there may additionally be employed a second dihydroxyaromatic compound of the formula,

  (VIII)

wherein $A^1$ is a divalent aromatic radical. Such radicals include aromatic hydrocarbon and substituted aromatic hydrocarbon radicals, with illustrative substituents being alkyl, cycloalkyl, alkenyl (e.g., crosslinkable-graftable moieties such as allyl), halo (especially fluoro, chloro and/or bromo), nitro and alkoxy.

The preferred $A^1$ values have the formula,

  (IX)

wherein each of $A^2$ and $A^3$ is a monocyclic divalent aromatic radical and Y is a briding radical in which one or two atoms separate $A^2$ from $A^3$. The free valence bonds in Formula IX are usually in the meta or para positions of $A^2$ and $A^3$ in relation to Y.

In Formula IX, the $A^2$ and $A^3$ values may be unsubstituted phenylene or substituted derivatives thereof wherein the substituents are as defined for $A^1$. Unsubstituted phenylene radicals are preferred. Both $A^2$ and $A^3$ are preferably p-phenylene, although both may be o- or m-phenylene or one o- or m-phenylene and the other p-phenylene.

The bridging radical, Y, is one in which one or two atoms, preferably one, separate $A^2$ from $A^3$. It is most often a hydrocarbon radical and particularly a saturated $C_{1-12}$ aliphatic or alicyclic radical such as methylene, cyclohexylmethylene, [2.2.1.]bicycloheptylmethylene, ethylene, ethylidene, 2,2-propylidene, 1,1-(2,2-dimethylpropylidene), cyclohexylidene, cyclopentadecylidene, cyclododecylidene, or 2,2-adamantylidene, especially an alkylidene radical. Aryl-substituted radicals are included, as are unsaturated radicals and radicals containing atoms other than carbon and hydrogen; e.g., oxy groups. Substituents such as those previously described with respect to $A^1$ may be present on the aliphatic, alicyclic and aromatic portions of the Y group.

For the most part, the suitable compounds include biphenols and especially bisphenols. Frequent reference will be made to bisphenols hereinafter, but it should be understood that other compounds equivalent thereto may be employed as appropriate. Bisphenol A (in which Y is isopropylidene and $A^2$ and $A^3$ are each p-phenylene) is preferred for reasons of availability and particular suitability for the purposes of the invention.

The carboxylic acids which may be used include the aromatic dicarboxylic acids. The difunctional carboxylic acids which may be used generally will conform to the formula,

HOOC—(R$^2$)—COOH ,  (X)

wherein $R^2$ is an aromatic group such as phenylene, biphenylene, substituted phenylene, substituted biphenylene, naphthylene, and substituted naphthylene, two or more aromatic groups connected through non-aromatic linkages such as alkylidene groups; and a divalent aralkyl radical such as tolylene, xylylene, and the like.

Preferred difunctional carboxylic acids are the aromatic dicarboxylic acids, i.e., those acids of Formula X wherein $R^2$ represents a dilvalent aromatic radical. The preferred aromatic dicarboxylic acids are those represented by the general formula,

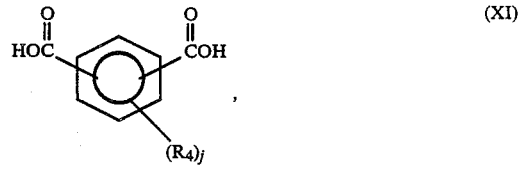  (XI)

wherein $R^4$ is independently selected from monovalent hydrocarbon radicals and halogen radicals, and j is a positive integer having a value of from 0 to 4 inclusive.

The monovalent hydrocarbon radicals represented by $R^4$ include the alkyl radicals, the cycloalkyl radicals, the aryl radicals, the aralkyl radicals, and the alkaryl radicals. The carbon atome limitations for each group are the same as for the aforementioned R group of Formula VII.

The preferred halogen radicals are the chlorine and bromine radicals. Alkyl of one to five carbon atoms is also preferred.

Particularly useful aromatic dicarboxylic acids of Formula XI are those wherein j is 0 to 3, and $R^4$ is an alkyl radical, preferably one containing from 1 to about 5 carbon atoms.

When more than one $R^4$ substituent is present on the ring carbon atoms of the aromatic carbocyclic residue they may be the same or different.

Mixtures of these carboxylic acids may be employed in lieu of individual carboxylic acid to form copolyarylates. Therefore, wherever the term difunctional carboxylic acid is employed herein it is meant to include mixtures of two or more different difunctional carboxylic acids as well as individual difunctional carboxylic acids.

Particularly useful aromatic dicarboxylic acids are isophthalic acid, terephthalic acid, and mixtures thereof.

Rather than utilizing the difunctional aromatic carboxylic acids per se it is possible, and sometimes even preferred, to employ ester forming reactive derivatives such as the acid dichlorides. Thus, for example, instead of using isophthalic acid, terephthalic acid, or mixtures thereof it is possible to use isophthaloyl dichloride, terephthaloyl dichloride, or mixtures thereof.

The polyesters which are suitable for use in synthesizing the polyester-polyarylate copolymer are derived from an aliphatic diol containing from 2 to 4 carbon atoms and at least one aromatic dicarboxylic acid. The polyesters have repeating structural units of the following general formula:

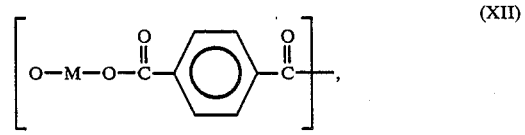  (XII)

wherein M is an integer of from 2-4. The preferred polyesters are poly(ethylene terephthalate) and poly(butylene terephthalate), and most preferred is poly(ethylene terephthalate).

The magnesium catalyst which may be used in the polyarylate formation reaction is selected from magnesium, magnesium oxide, and magnesium salt of an inorganic acid, or organic acid or mixtures thereof, as disclosed by Maresca et al., U.S. Pat. No. 4,296,232 and Berger et al., U.S. Pat. No. 4,294,956, the disclosures of which are incorporated by reference herein. The salts of the organic acid include acetates, propionates, benzoates, oxalates, acetyl-acetonates, or mixtures thereof. The preferred catalyst is magnesium acetate. The catalyst is present in the reaction in a catalytically effective amount which can be, for example, fromabout 1 to about 1000, preferably from about 10 to about 50 parts per million, based on the weight of the polyarylate produced.

The reaction of the diester derivative of a spiro dihydric phenol and, optionally, a dihydric phenol with an aromatic dicarboxylic acid or acids or derivatives thereof are carried out in the presence of from about 10 to about 60, preferably from about 25 to about 40, and most preferably, from about 30 to about 40 weight percent, based on the weight of the polyarylate produced, of a diphenyl ether compound. The diphenyl ether compund may be substituted. These substituents are selected from alkyl groups, chlorine, bromine, or any substituent which does not interfere with the polyarylate-forming reaction.

The utilization of from about 10 to about 60 percent of a diphenyl ether compound in the diacetate process prevents sublimation of the aromatic dicarboxylic acid; thus producing polyarylates of acceptable molecular weight. Also, the diphenyl ether compound provides for better removal of the acetic acid by-product. Further, an additional benefit in using a diphenyl ether compound in the amounts indicated is that the viscosity of the system is decreased. This decrease in viscosity provides a faster reaction time since better mixing of the reactants occurs which allows the reaction to proceed more quickly.

The process of this polyarylate formation is carried out at a temperature of from about 260 to about 350° C. and preferably, from about 290° to about 320° C. The present process is generally conducted in an inert atmosphere (argon or nitrogen) to prevent deleterious side reactions.

The polyarylate melt polymerization formation reaction may be carried out batchwise or continuously, and by using any apparatus desired. Melt polymerization as used herein is defined as the reaction between at least two monomers at high concentration and high temperature. Moreover, the reactants may be added in any way or order desired as long as the polymerization takes place in the presence of from about 10 to about 60 weight percent of diphenyl ether compounds.

The reaction time is generally in the range of from about 4 hours to about 8 hours, depending on the particular polyarylate being prepared. The polymerization reaction is conducted for a period of time sufficient to form the polyarylate as denoted by discontinuation of the evolution of by-product.

The polyarylate may be prepared in the presence of other materials such as molecular weight regulators, antioxidants, thermal stabilizers, and the like. The polyarylates obtained may also be prepared in the presence of well-known additives such as plasticizers, pigments, lubricating agents, mold release agents, stabilizers, inorganic fillers, and the like.

The process for preparing the spirobiindane polyarylate-polyester copolymer requires a reaction temperature of from about 260° C. to about 350° C. and preferably, from about 290° C. to about 320° C. The process is generally conducted at reduced pressure of from about 0.5 mm Hg to about 100 mm Hg to provide a means for removing undesirable by-products formed in the resulting copolymer.

The spirobiindane polyarylate-polyester copolymer formation reaction may be carried out batchwise or continuously, and by using any apparatus desired. Moreover, the reactants may be added in any amount, method, or order desired as long as the spirobiindane polyarylate-polyester copolymer has only one $T_g$, is of higher molecular weight than the original spirobiindane polyarylate used to generate the copolymer, and maintains physical properties inherent to both the starting polyarylate and polyester. The preferred reaction of spirobiindane polyarylate with polyester occurs when the ratio by weight is 3:1.

The reaction time is generally in the range of from about 30 minutes to 3 hours, depending on the particular copolymer being prepared. The solid copolymer is formed by allowing the reaction mixture to cool to room temperature.

The invention is further illustrated but not limited by the following examples:

EXAMPLE 1

To a 3-neck round bottom flask, equipped with a mechanical stirrer and a fractional distillation column was added 30.00 g (0.0768 mol) of spirobiindane diacetate, 13.00 g (0.0780 mol) of isophthalic acid, 10 mg of magnesium acetate trihydrate and 20 ml of diphenyl ether. The flask was immersed into a 290° C. salt bath. After 30 min, acetic acid distilled from the pot indicating polymerization had occurred. The reaction vessel was heated at 290° C. for 4.5 hrs, raised to 300° C. for one hour and then 310° C. for one hr. The diphenyl ether was removed by vacuum distillation (20 mm Hg for 2 hr.). The polymerization was completed at 330° C. and 1.0 mm Hg for 5 hrs. The polymer isolated was an amorphous yellow solid having $^{13}C$ NMR analysis consistent with a spirobiindane isophthalic acid polyarylate. The $T_g$ of the resultant polyarylate is about 245° C.

EXAMPLES 2-5

The procedure of Example 1 was substantially repeated except that the 13.00 g of isophthalic acid are replaced with an isophthalic-terephthalic acid mixture. Reactive amounts of each component by grams and mole ratio are specified in Table I. The $T_g$ of the resultant copolyarylate is determined and the results are also set forth in Table I:

TABLE I

| Example No. | Grams Isophthalic Acid | Grams Terephthalic Acid | Mole Ratio IPA/TPA | ml Diphenyl Ether | $T_g$ (°C.) |
|---|---|---|---|---|---|
| 2 | 9.63 | 3.21 | 75:25 | 17.0 | 259 |
| 3 | 6.42 | 6.42 | 50:50 | 17.0 | 267 |
| 4 | 3.21 | 9.63 | 25:75 | 17.0 | 278 |
| 5 | 0.64 | 12.20 | 5:95 | 17.0 | 291 |

The first series of copolyarylates were prepared by adding terephthalic acid to the original reaction mixture of Example 1. The $T_g$ of the resulting polyarylates vary from about 245° C. for the homopolymer with isophthalic acid as the diacid component, to 291° C. for the copolymer prepared from a mixture of 95:5% terephthalic acid to isophthalic acid. The $T_g$ of the intermediate compositions increased linearly with the addition of terephthalic acid.

EXAMPLES 6-8

The procedure of Example 1 is substantially repeated except that the spirobiindane diacetate is replaced with a spirobiindane diacetate-bisphenol A diacetate mixture. Reactive amounts by grams and mole ratio are specified in Table II.

The $T_g$ of the resultant polyarylate is determined and the results are also set forth in Table II:

TABLE II

| Ex. No. | Grams Spirobiindane Diacetate | Grams Bisphenol A Diacetate | Mole Ratio SBI/BPA | Grams Isophthalic Acid | ml Diphenyl Ether | $T_g$ (°C.) |
|---|---|---|---|---|---|---|
| 6 | 20.00 | 3.81 | 80:20 | 11.48 | 14.1 | 231 |
| 7 | 15.00 | 8.58 | 70:30 | 12.92 | 14.6 | 215 |
| 8 | 10.00 | 17.15 | 30:70 | 17.10 | 17.7 | 195 |

The second series of copolymers generated were derived from the addition of bisphenol A diacetate to the original reaction mixture of Example 1. The $T_g$ of the resulting polyarylates vary from 245° C. for the original homopolymer of Example 1 to 181° C. for a homopolymer consisting of bisphenol A and isophthalic acid, commerically available as Arylon, from duPont. The glass transition temperatures of the intermediate compositions in this series decreased linearly with the addition of bisphenol A.

EXAMPLES 9-11

The procedure of Example 1 is substantially repeated except that in addition to 6.42 g of isophthalic acid, 6.42 g of terephthalic acid is added. Further, the 34.2 g of spirobiindane diacetate are replaced with a spirobiindane diacetate-bisphenol A diacetate mixture, reaction amounts by grams and mole ratio are specified in Table III.

The $T_g$ of the resultant polyarylate is determined and the results are set forth in Table III:

TABLE III

| Example No. | Grams Spirobiindane Diacetate | Grams Bisphenol A Diacetate | Mole Ratio SBI/BPA | ml Diphenyl Ether | $T_g$ (°C.) |
|---|---|---|---|---|---|
| 9 | 22.50 | 4.27 | 75:25 | 17.0 | 251 |
| 10 | 15.00 | 8.53 | 65:35 | 17.0 | 238 |
| 11 | 7.50 | 12.80 | 25:75 | 17.0 | 225 |

The final series of polyarylate compositions prepared were comprised of combinations of spirobiindane and bisphenol A with a 1:1 mixture of iosphthalic acid and terephthalic acid. The $T_g$ of the resulting polyarylates vary from 191° C. for the bisphenol A homopolymer commercially available as Ardel, from Union Carbide, to 267° C. for the spirobiindane containing copolymer of Example 3. These compositions also had a linear increase in $T_g$ with the addition of the spirobiindane.

EXAMPLE 12

To a test tube reactor equipped with a helical glass mechanical stirring shaft was added 3.0 g (Mw=46,000) of spirobiindane-isophthalate polyarylate and 1.0 g (I.V. 0.80) of polyethylele terephthalate. The mixture was heated to 320 C. at reduced pressure of 1 mm Hg. After one hour the heat was removed and the reaction mixture was allowed to cool to room temperature. The polymer isolated was an amorphous yellow solid having a $^{13}C$ NMR analysis consistent with a spirobiindane isophthalate-polyethylene terephthalate copolymer. The copolymer synthesized had Mw=59.000 and Mn=18,800.

As illustrated by the data in Tables I, II or III, three novel series of spirobiindane bisphenol containing polyarylates have been synthesized and identified. The polyarylates differ in composition by either the ratio of spirobiindane to bisphenol A or isophthalic to terephthalic acids. The glass transition temperatures of these spirobiindane-containing polyarylates range from 182° C. to 291° C. Thus, it is possible to prepare a polyarylate with any desired glass transition temperature between the SBI and bisphenol-A homopolymer extremes by simply varying the percent composition of each of the dihydric and diacid monomers in the polymer formation reaction.

The data of Example 12 also shows that the copolymers of spirobiindane polyarylate and polyethylene terephthalate prepared by mewlt transesterification exhibit significantly higher glass transition temperatures and molecular weights than the conventional prior art polyarylate-polyester copolymer. Further, the spirobiindane polyarylate-polyester copolymer possesses a lower glass transition temperature than the spirobiindane polyarylate used originally to generate the copolymer.

What is claimed and sought to be protected by Letters Patent of the United States is as follows:

1. A method for preparing a spirobiindane polyarylate-polyester copolymer which comprises reacting at a temperature of above 260° C., (A) at least one polyarylate having the formula:

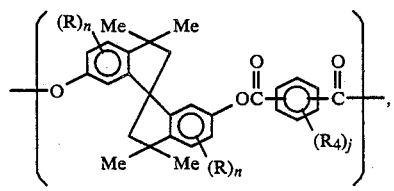

wherein R is a monovalent hydrocarbon radical selected from the group consisting of alkyl radicals, cycloalkyl radicals, aryl radicals, aralkyl radicals, alkaryl raldicals, and halogen radicals; $R^4$ are a monovalent hydrocarbn radical selected from the group consisting of alkyl radicals, cycloalkyl radicals, aryl radicals, aralkyl radicals, alkaryl raldicals, and halogen radicals; n is a positive integers having a value from 0 to 3 inclusive; and j is a positive integer having a value of from 0-4 inclusive, and (B) at least one polyester having repeating units of the general formula:

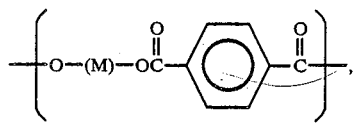

wherein M is a polymethylene of 2-4 carbons.

2. The method of claim 1, wherein the reaction occurs are reduced pressure of from about 0.5 mm Hg to about 100 mm Hg.

3. The method of claim 1, wherein the reaction temperature is betweeen about 290° C. to about 320° C.

4. The method of claim 1, wherein the compound of part (A) is spirobiindane-isophthalate polyarylate.

5. The method of claim 1, wherein the polyarylate to polyester ratio in the mixture is about 3:1.

* * * * *